United States Patent [19]

Ishimoto et al.

[11] Patent Number: 5,008,575
[45] Date of Patent: Apr. 16, 1991

[54] LIFTING STRUCTURE FOR DYNAMIC ELECTRIC MACHINE

[75] Inventors: Noriyuki Ishimoto, Aichi; Hirofumi Iida, Obu, both of Japan

[73] Assignee: Sumitomo Heavy Industries, Ltd., Tokyo, Japan

[21] Appl. No.: 516,994

[22] Filed: Apr. 30, 1990

[51] Int. Cl.$^5$ .............................................. H02K 5/26
[52] U.S. Cl. ...................................... 310/89; 310/64; 310/91
[58] Field of Search ............................. 310/91, 89, 64

[56] References Cited

FOREIGN PATENT DOCUMENTS 1217992 1/1971 United Kingdom ................... 310/89
8706401 10/1987 World Int. Prop. O. ............ 310/89

Primary Examiner—Steven L. Stephan
Assistant Examiner—Thomas M. Dougherty
Attorney, Agent, or Firm—Armstrong, Nikaido, Marmelstein, Kobovcik & Murray

[57] ABSTRACT

A lifting structure for lifting a dynamic electric machine of the type having a substantially cylindrical stator frame provided on the outer peripheral surface thereof with a plurality of heat radiating ribs extending in the longitudinal direction of the machine. The structure includes grooves formed by casting or extrusion in the opposing walls of two adjacent heat radiating ribs so as to extend in the longitudinal direction of the machine. The structure also includes a lifting member such as an eye bolt provided at its lower portion with a sliding engaging portion with an expanded portion such as a nut for sliding engagement with the grooves.

1 Claim, 3 Drawing Sheets

LIFTING STRUCTURE FOR DYNAMIC ELECTRIC MACHINE

BACKGROUND OF THE INVENTION

1. Field of the Invention

The present invention relates to a lifting structure which is provided on a dynamic electric machine and used when the machine is lifted.

2. Description of the Related Art

As shown in FIGS. 1 and 3, a dynamic electric machine has a stator frame 3 of a substantially circular cross-section. One end of the stator frame 3 is closed by an outer fan cover 1 and a terminal box 2 is provided on one side of the stator frame 3. Heat-radiating longitudinal ribs are formed on the outer surface of the stator frame 3 so as to extend in the axial direction of the stator frame 3. A lifting member 4 is fixed to the outer surface of the stator frame 3. The rotor shaft 6 of the motor projects outside from a mounting flange 5 which is provided on the end of the stator frame opposite to the outer fan cover 1. The lifting member 4 is an eye bolt in the illustrated case. The means for fixing the lifting member 4 includes a supporting portion 3A formed as a part of the stator frame 3 and having a threaded internal bore. The lifting member 4 has a threaded end portion which is screwed into the bore, whereby the fixing member 4 is fixed to the stator frame 3.

Thus, in the known arrangement described above, the position on the stator frame 3 to which the lifting member is connected is fixed. Therefore, when a geared motor 8 having a reduction gear 7 is coupled to the dynamic electric machine through the mounting flange 5 as shown in FIG. 2, since the weight of the reduction gear 7 largely varies depending on the reduction ratio, the position of the gravity center is largely moved to cause an unbalance of mass when the machine is lifted by, for example, a wire rope retained by the lifting member 4. Such a way of lifting is quite dangerous since the machine cannot be held stably. The position of the weight center also varies depending on whether the geared motor 8 is coupled to the mounting flange 5, with the result that a danger is often caused when lifting the machine with or without the geared motor 8.

In addition, the cost of the machine is raised due to the necessity for the formation of the threaded bore in the supporting portion of the stator frame.

SUMMARY OF THE INVENTION

Accordingly, an object of the present invention is to provide a lifting structure for a dynamic electric machine which enables the position of the lifting member to be varied in accordance with a shifting of the position of the center of gravity of the machine, thereby enabling the machine to be lifted safely in a stable manner, while eliminating the necessity of machining for forming a threaded bore, thus reducing the production cost.

To this end, according to the present invention, there is provided a lifting structure for lifting a dynamic electric machine having a substantially cylindrical stator frame provided on the outer peripheral surface thereof with a plurality of heat radiating ribs extending in the longitudinal direction of the machine, the structure comprising: grooves formed in the opposing walls of two adjacent heat radiating ribs so as to extend in the longitudinal direction of the machine; and a lifting member provided at its lower portion with a sliding engaging portion having an expanded portion which is slidably received in the grooves.

The lifting member is slidable over the entire axial length of the dynamic electric machine, because the sliding engaging portions on the lower end of the lifting member are slidably received in the grooves formed in the opposing walls of two adjacent ribs. This makes it possible to adjust the position of the lifting member in accordance with a change in the position of the gravity center of the dynamic electric machine, thus enabling the machine to be lifted in a well balanced state.

DESCRIPTION OF THE PREFERRED EMBODIMENT

Figure 1:
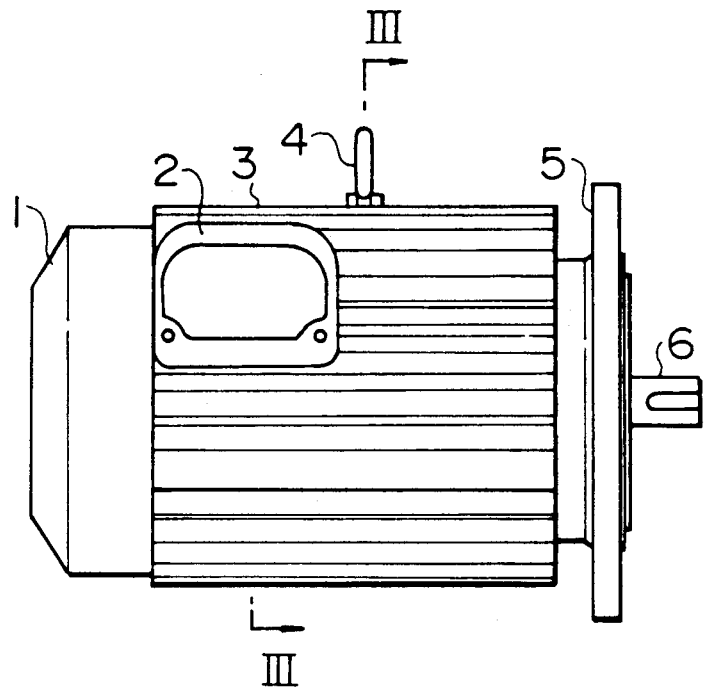
FIG. 1 is a front elevational view of a dynamic electric machine.
Figure 2:
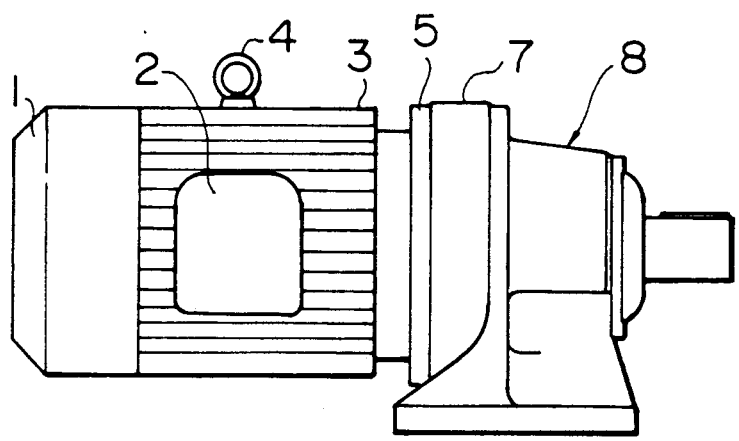
FIG. 2 is a front elevational view of a dynamic electric machine with a geared motor coupled thereto.
Figure 3:
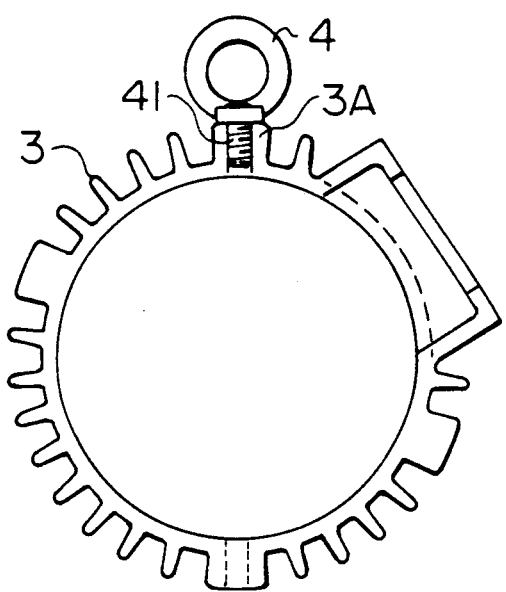
FIG. 3 is a sectional view taken along the line III—III of FIG. 1.
Figure 4:
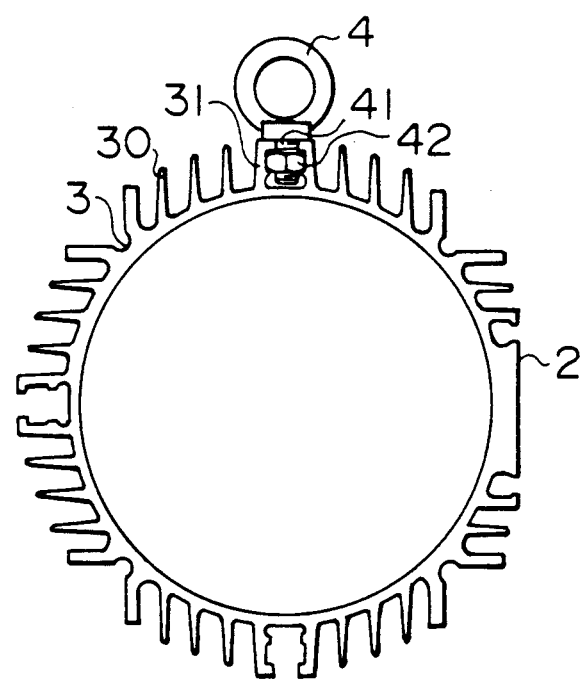
FIG. 4 is a sectional view of an embodiment of the present invention.
Figure 5:
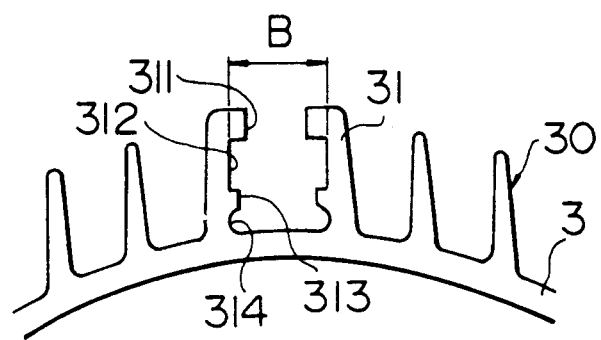
FIG. 5 is an enlarged sectional view of an essential portion of the embodiment.
Figure 6:
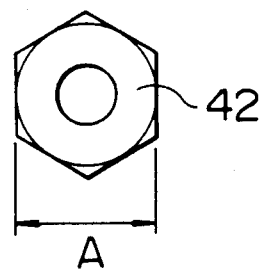
FIG. 6 is an enlarged view of a critical portion of the present invention.

Referring to FIGS. 4 to 6, a dynamic electric machine has a substantially cylindrical stator frame 3 provided with a lot of longitudinal heat radiation ribs formed on the outer surface thereof as is the case of the electric machine shown in FIG. 1 having a known lifting structure. In the illustrated embodiment, the outer peripheral surface of the stator frame 3 is divided into four regions, and the heat radiating fins 30 in each region are made parallel to one another.

In each of the above-mentioned four regions except the region where the terminal box 2 is formed, two adjacent ribs 31, 31 positioned substantially at the center of the group of parallel ribs 30 are provided in their opposing surfaces with radially outer and inner ridges 311 and 313 which are formed by, for example, casting or extrusion so as to extend over the entire length of the ribs 31. The radially outer and lower ridges 311 and 313 on each rib 31 define therebetween a longitudinal groove 312. A longitudinal groove 314 is defined below the ridge 313.

An eye bolt as the lifting member 4 has a threaded bolt portion at its lower end to which is screwed a nut 42. The nut 42 is slidably received in the slide grooves 312 formed in the opposing walls of the ribs 31.

According to this arrangement, the lifting member 4 can be moved along the ribs 31 to any desired position and fixed to this position as the eye bolt is rotated until the nut 42 bears against the surfaces of the ridges 311 on both ribs 31. Thus, when the position of the gravity center of the dynamic electric machine is changed, the lifting member 4 is moved to a position where the machine can be stably lifted with good balance, and is fixed at this position by tightening the eye bolt.

Preferably, the distance B between the bottoms of the slide grooves 312 and 312 in both ribs 31 and 31 is determined to be slightly greater than the distance A between two parallel surfaces of the nut 42 shown in FIG. 6 so that the nut 42 can smoothly slide in the slide grooves 312, 312.

Although an eye bolt is used as the lifting member 4 in this embodiment, this is only illustrative and various other members can be used as the lifting member. For instance, the lifting member may be composed of a bolt with a head slidably received in the slide grooves, and a hook or the like member having a threaded bore for screwing engagement with the upwardly projecting threaded stem of the bolt.

Thus, any type of member, integral or made up of separate members, can be used provided that it is provided at its lower end with sliding engaging portion having an expanded portion and a locating means.

As has been described, according to the lifting structure of the present invention, the lifting member can be moved in the longitudinal direction of the dynamic electric machine to position where it can suspend the machine in a well-balanced state. It is therefore possible to lift the machine in a quite stable and safe manner.

Although the invention has been described through specific terms, it is to be understood that the described embodiment is only illustrative and various changes and modifications may be imparted thereto without departing from the scope of the invention which is limited solely by the appended claim.

What is claimed is:

1. A lifting structure for lifting a dynamic electric machine having a substantially cylindrical stator frame provided on an outer peripheral surface thereof with a plurality of heat radiating ribs extending in a longitudinal direction of said machine, said lifting structure comprising:

grooves formed in opposing walls of two adjacent heat radiating ribs so as to extend in the longitudinal direction of said machine;

outer and inner ridges radially provided on each said opposing wall to define therebetween each said groove; and a lifting member provided at a lower portion with a sliding engaging portion having an expanded portion which is slidably received in said grooves.

* * * * *